(12) United States Patent
Takeuchi et al.

(10) Patent No.: US 7,981,546 B2
(45) Date of Patent: Jul. 19, 2011

(54) NON-AQUEOUS ELECTROLYTE SECONDARY BATTERY

(75) Inventors: Takashi Takeuchi, Osaka (JP); Akihiro Taniguchi, Hyogo (JP); Shuji Tsutsumi, Nara (JP); Kensuke Nakura, Osaka (JP); Hiroshi Matsuno, Osaka (JP); Hideo Sasaoka, Ehime (JP); Satoshi Matsumoto, Ehime (JP)

(73) Assignees: Panasonic Corporation, Osaka (JP); Sumitomo Metal Mining Co., Ltd., Tokyo (JP)

( * ) Notice: Subject to any disclaimer, the term of this patent is extended or adjusted under 35 U.S.C. 154(b) by 1050 days.

(21) Appl. No.: 11/794,579

(22) PCT Filed: Apr. 17, 2006

(86) PCT No.: PCT/JP2006/308048
§ 371 (c)(1),
(2), (4) Date: Jul. 2, 2007

(87) PCT Pub. No.: WO2006/118013
PCT Pub. Date: Nov. 9, 2006

(65) Prior Publication Data
US 2009/0035659 A1    Feb. 5, 2009

(30) Foreign Application Priority Data
Apr. 28, 2005    (JP) .................................. 2005-133135

(51) Int. Cl.
*H01M 4/48*    (2010.01)

(52) U.S. Cl. ............... 429/231.3; 429/231.1; 429/231.5; 429/231.6; 429/223; 429/224; 429/218.1; 252/519.15; 252/520.2; 252/520.5; 252/521.2; 252/518.1

(58) Field of Classification Search ............... 429/231.3, 429/231.1, 231.5, 231.6, 223, 224, 218.1; 252/519.15, 520.2, 520.5, 521.2, 518.1
See application file for complete search history.

(56) References Cited

U.S. PATENT DOCUMENTS

| 5,631,105 | A | 5/1997 | Hasegawa et al. |
| 2001/0028874 | A1 | 10/2001 | Cho et al. |
| 2004/0126660 | A1 | 7/2004 | Ohzuku et al. |
| 2004/0161668 | A1 | 8/2004 | Maeda et al. |
| 2004/0191161 | A1* | 9/2004 | Wang et al. ................ 423/594.2 |

FOREIGN PATENT DOCUMENTS

| CN | 1581543 | 2/2005 |
| EP | 0 986 117 A1 | 3/2000 |
| JP | 63-121258 | 5/1988 |
| JP | 5-242891 | 9/1993 |
| JP | 9-274917 | 10/1997 |
| JP | 11-040154 | 2/1999 |
| JP | 11-045707 | 2/1999 |
| JP | 11-246225 | 9/1999 |
| JP | 2000-030693 | 1/2000 |
| JP | 2001-110413 | 4/2001 |
| JP | 2002-015740 | 1/2002 |
| JP | 2003-308827 | 10/2003 |
| JP | 2004-087487 | 3/2004 |
| JP | 2004-111076 | 4/2004 |
| JP | 2004-171961 | 6/2004 |
| JP | 2004-311297 | 11/2004 |
| WO | WO 2004/114452 A1 | 12/2004 |

OTHER PUBLICATIONS

Chinese Office Action issued in Chinese Patent Application No. CN 2006800050485, dated Oct. 10, 2008.

* cited by examiner

*Primary Examiner* — Laura S Weiner
(74) *Attorney, Agent, or Firm* — McDermott Will & Emery LLP

(57) ABSTRACT

A lithium-containing composite oxide represented by the formula 1: $Li_xNi_{1-y-z-v-w}Co_yAl_zM^1_vM^2_wO_2$ is used as a positive electrode active material for a non-aqueous electrolyte secondary battery. The element $M^1$ is at least one selected from the group consisting of Mn, Ti, Y, Nb, Mo, and W. The element $M^2$ includes at least two selected from the group consisting of Mg, Ca, Sr, and Ba, and the element $M^2$ includes at least Mg and Ca. The formula 1 satisfies $0.97 \leq x \leq 1.1$, $0.05 \leq y \leq 0.35$, $0.005 \leq z \leq 0.1$, $0.0001 \leq v \leq 0.05$, and $0.0001 \leq w \leq 0.05$. The primary particles have a mean particle size of 0.1 μm or more and 3 μm or less, and the secondary particles have a mean particle size of 8 μm or more and 20 μm or less.

12 Claims, 4 Drawing Sheets

NON-AQUEOUS ELECTROLYTE SECONDARY BATTERY

RELATED APPLICATIONS

This application is the U.S. National Phase under 35 U.S.C. §371 of International Application No. PCT/JP2006/308048, filed on Apr. 17, 2006, which in turn claims the benefit of Japanese Application No. 2005-133135, filed on Apr. 28, 2005, the disclosures of which Applications are incorporated by reference herein.

TECHNICAL FIELD

The present invention relates to non-aqueous electrolyte secondary batteries, and, more specifically, to an improvement in positive electrode active materials thereof.

BACKGROUND ART

In recent years, commercial electronic devices are rapidly becoming cordless and more portable. There is an increasing demand for secondary batteries that are compact, light-weight, and high in energy density as power sources for driving such devices. From such a viewpoint, there is a large expectation for non-aqueous electrolyte secondary batteries, particularly lithium secondary batteries having high voltage and high energy density, and their prompt development is desired.

Non-aqueous electrolyte secondary batteries include a positive electrode, a negative electrode, and a separator interposed therebetween. The separator is typically a polyolefin micro-porous film. The non-aqueous electrolyte comprises an aprotic organic solvent and a lithium salt such as $LiBF_4$ or $LiPF_6$ dissolved therein.

Recently, batteries including a lithium-containing composite oxide as a positive electrode active material and including a carbon material, a silicon compound, a tin compound, or the like as a negative electrode material have been receiving attention as high energy-density lithium secondary batteries. As the lithium-containing composite oxide, lithium cobalt oxides (e.g., $LiCoO_2$) have been commercialized. Lithium cobalt oxides have high potential relative to lithium, offer excellent safety, and can be synthesized relatively easily.

In order to avoid the resource problem of cobalt and achieve higher capacity, many attempts have been made to commercialize lithium nickel oxides (e.g., $LiNiO_2$). Nickel is naturally abundant, readily available at low costs, and suited for achieving high capacity. However, in the case of $LiNiO_2$, the capacity is high, but the thermal stability of its crystal is low and the cycle characteristics and high-temperature storage characteristics need to be improved. Thus, the following proposals have been made.

In order to improve the thermal stability of $LiNiO_2$, Patent Document 1 proposes doping $LiNiO_2$ with Co and Al. However, the thermal stability is improved to some extent, but satisfactory characteristics cannot be obtained with respect to cycle characteristics and high-temperature storage characteristics.

In order to improve cycle characteristics and high-temperature storage characteristics, Patent Document 2 proposes positive electrode active materials represented by the general formula: $Li_xNi_{1-y-z}Co_yMn_zA_aO_2$ (where A is at least one selected from the group consisting of Fe, V, Cr, Mn, Ti, Mg, Al, B, and Ca, $0.05 \leq x \leq 1.10$, $0.10 \leq y+z \leq 0.70$, $0.05 \leq z \leq 0.40$, and $0 \leq a \leq 0.1$), with an electronic conductivity σ such that $10^{-4} \leq \sigma \leq 10^{-1}$ S/cm. However, active materials of such composition enabling improvements in cycle characteristics and high-temperature storage characteristics are not practical since they have low capacities.

In order to improve cycle characteristics, Patent Document 3 proposes positive electrodes including graphite, carbon black, and a positive electrode active material represented by the general formula: $A_wP_vNi_xM_yN_zO_2$ (where A is at least one selected from alkali metals, P is at least one selected from the group consisting of Mg, B, P, and In, M is at least one selected from the group consisting of Mn, Co, and Al, N is at least one selected from the group consisting of Si, Al, Ca, Cu, Sn, Mo, Nb, Y, and Bi, $0.05 \leq w \leq 1.2$, $0.0001 \leq v \leq 0.2$, $0.5 \leq x \leq 0.95$, $0.005 \leq y \leq 0.5$, and $0 \leq z \leq 0.2$). However, the high-temperature storage characteristics of batteries are determined by the crystal stability of the positive electrode active material. Hence, the conductive agents (graphite and carbon black) do not sufficiently contribute to an improvement in high-temperature storage characteristics.

In order to improve cycle characteristics, Patent Document 4 proposes the use of positive electrode active materials represented by the general formula: $A_xB_yC_zD_wO_2$ (where A is at least one selected from alkali metals, B is transition metal, C is at least one selected from the group consisting of Al, In, and Sn, and D is at least one selected from the group consisting of (a) alkali metals excluding A, (b) transition metals excluding B, (c) IIa group elements, and (d) second to sixth period elements of IIIb group (excluding Al and In), IVb group (excluding carbon and Sn) and Vb group (excluding oxygen), $0.05 \leq x \leq 1.10$, $0.85 \leq y \leq 1.00$, $0.001 \leq z \leq 0.10$, and $0.001 \leq w \leq 0.10$). However, the use of cobalt as the transition metal allows an improvement in cycle characteristics, but the use of nickel as the transition metal does not permit a sufficient improvement.

In order to improve high-temperature storage characteristics, Document 5 proposes adding 100 to 1500 ppm alkali metal and/or alkaline-earth metal element(s) to a composite oxide of lithium and transition metal. The use of cobalt as the transition metal allows an improvement in high-temperature storage characteristics. However, the use of nickel as the transition metal does not permit a sufficient improvement.

Patent Document 1: Japanese Laid-Open Patent Publication No. Hei 5-242891
Patent Document 2: Japanese Laid-Open Patent Publication No. 2004-111076
Patent Document 3: Japanese Laid-Open Patent Publication No. Hei 11-40154
Patent Document 4: Japanese Laid-Open Patent Publication No. Sho 63-121258
Patent Document 5: Japanese Laid-Open Patent Publication No. 2002-15740

DISCLOSURE OF INVENTION

Problem that the Invention is to Solve

As described above, with respect to improvements of lithium nickel oxides, there has been no approach that is effective for both cycle characteristics and high-temperature storage characteristics without impairing the high capacity advantage of nickel.

The present invention is achieved in view of the above and intends to realize a high-capacity non-aqueous electrolyte secondary battery that is excellent in both cycle characteristics and high-temperature storage characteristics as well as discharge load characteristics by improving a lithium nickel oxide contained in a positive electrode.

Means for Solving the Problem

The present invention relates to a positive electrode active material for a non-aqueous electrolyte secondary battery, which includes a lithium-containing composite oxide represented by the formula 1: $Li_xNi_{1-y-z-v-w}Co_yAl_zM^1_vM^2_wO_2$. The element $M^1$ in the formula 1 is at least one selected from the group consisting of Mn, Ti, Y, Nb, Mo, and W. The element $M^2$ in the formula 1 includes at least two selected from the group consisting of Mg, Ca, Sr, and Ba, and the element $M^2$ includes at least Mg and Ca. The formula 1 satisfies $0.97 \leq x \leq 1.1$, $0.05 \leq y \leq 0.35$, $0.005 \leq z \leq 0.1$, $0.0001 \leq v \leq 0.05$, and $0.0001 \leq w \leq 0.05$. The composite oxide represented by the formula 1 comprises primary particles, and the primary particles form secondary particles. The primary particles have a mean particle size of 0.1 μm or more and 3 μm or less, and the secondary particles have a mean particle size of 8 μm or more and 20 μm or less.

The present invention is also directed to a non-aqueous electrolyte secondary battery including a positive electrode, a negative electrode, a separator interposed between the positive electrode and the negative electrode, and an electrolyte. The positive electrode includes the positive electrode active material comprising the above-mentioned lithium-containing composite oxide.

The BET specific surface area of the composite oxide of the present invention as measured by nitrogen gas adsorption is preferably 0.2 m²/g or more and 1.5 m²/g or less.

The formula 1 preferably satisfies the relation: $0.1 \leq v/w \leq 10$.

The atom number w1 of Mg and the atom number w2 of Ca contained in the composite oxide of the present invention preferably satisfy the relation: $2 \leq w1/w2 \leq 20$.

The tap density of the composite oxide of the present invention is preferably 2.2 g/cm³ or more and 2.8 g/cm³ or less.

Preferably, the composite oxide of the present invention is crystalline such that the Li occupancy in the Li site as determined by Rietveld analysis is 97% or more.

The present invention further relates to a method of producing a positive electrode active material comprising a lithium-containing composite oxide represented by the formula 1: $Li_xNi_{1-y-z-v-w}Co_yAl_zM^1_vM^2_wO_2$. The production method of the present invention includes the steps of: (a) preparing a hydroxide represented by the formula 2: $Ni_{1-y-v-w}Co_yM^1_vM^2_w(OH)_2$; (b) adding an Al-containing compound to the hydroxide to obtain a first composition; (c) baking the first composition in an oxidizing atmosphere to obtain a first oxide; (d) adding a Li-containing compound to the first oxide to obtain a second composition; and (e) baking the second composition in an oxidizing atmosphere to obtain the lithium-containing composite oxide represented by the formula 1 as a second oxide. The element $M^1$ in the formulae 1 and 2 is at least one selected from the group consisting of Mn, Ti, Y, Nb, Mo, and W. The element $M^2$ in the formulae 1 and 2 includes at least two selected from the group consisting of Mg, Ca, Sr, and Ba, and the element $M^2$ includes at least Mg and Ca. The formulae 1 and 2 satisfy $0.05 \leq y \leq 0.35$, $0.0001 \leq v \leq 0.05$, and $0.0001 \leq w \leq 0.05$. The formula 1 satisfies $0.97 \leq x \leq 1.1$ and $0.005 \leq z \leq 0.1$.

The step (b) preferably includes a step of adding $NaAlO_2$ to the hydroxide that is stirred in water and then adjusting the pH of the water to 10 to 8 by using an acid.

In the step (c), the first composition is preferably baked at 500° C. or more and 1100° C. or less in an oxidizing atmosphere to obtain the first oxide.

In the step (e), the second composition is preferably baked at 600° C. or more and 850° C. or less in an oxidizing atmosphere to obtain the second oxide.

The present invention relates to a positive electrode active material comprising a composite oxide that is obtained by the above-mentioned production method. The above-mentioned production method can easily provide a composite oxide in which primary particles aggregate to form secondary particles, the primary particles have a mean particle size of 0.1 μm or more and 3 μm or less, and the secondary particles have a mean particle size of 8 μm or more and 20 μm or less. Also, the above-mentioned production method can easily provide a composite oxide having a BET specific surface area, as measured by nitrogen gas adsorption, of 0.2 m²/g or more and 1.5 m²/g or less.

Effects of the Invention

According to the present invention, the crystal stability of a lithium-containing composite oxide is improved, and side reaction between a positive electrode active material and a non-aqueous electrolyte is suppressed. It is therefore possible to provide a high-capacity non-aqueous electrolyte secondary battery that is excellent in both cycle characteristics and high-temperature storage characteristics. Further, according to the present invention, it is possible to provide a non-aqueous electrolyte secondary battery that is also excellent in discharge load characteristics.

BEST MODE FOR CARRYING OUT THE INVENTION

Figure 1:
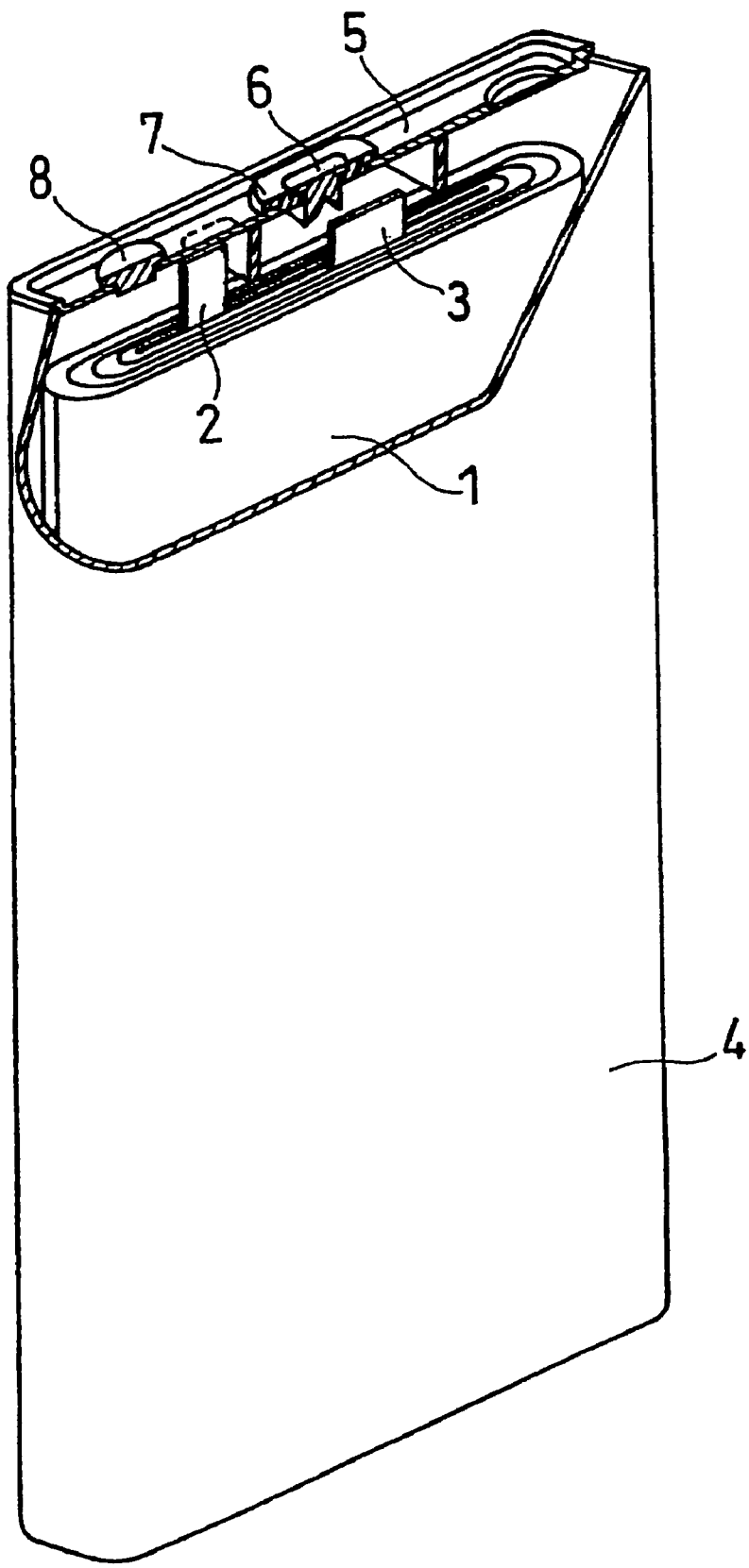
FIG. 1 is a partially cut-away perspective view of a prismatic battery according to the present invention.

A positive electrode of a non-aqueous electrolyte secondary battery of the present invention includes a positive electrode active material comprising a lithium-containing composite oxide, and the composite oxide is represented by the formula 1: $Li_xNi_{1-y-z-v-w}Co_yAl_zM^1_vM^2_wO_2$. That is, the composite oxide used as the positive electrode active material in the present invention is composed of $LiNiO_2$ doped with Co and Al, which have the effect of improving thermal stability, as well as the element $M^1$ and the element $M^2$. Al is believed to have the effect of suppressing reaction between the positive electrode active material and a non-aqueous electrolyte at high temperatures.

When a lithium nickel oxide is doped with Co and Al, the thermal stability of the crystal is improved. However, the use of a lithium nickel oxide doped with Co and Al is more likely to result in degradation of the cycle characteristics and high-temperature storage characteristics of the battery than the use of $LiCoO_2$. The cycle characteristics degrade probably because the crystal stability of the lithium nickel oxide doped with Co and Al deteriorates during charge.

Generally, the element $M^1$ and the element $M^2$ have the effect of improving the crystal stability of the lithium nickel oxide doped with Co and Al during charge.

The element $M^2$ generally tends to be introduced into a moiety other than the Ni layer for substitution and tends to be efficiently introduced into the Li layer of the positive electrode active material. This is because when the element $M^2$ is introduced into the Ni layer for substitution, it becomes trivalent or less (i.e., the valence of Ni in the crystal or a lower valence), thereby disturbing the electrical neutrality of the crystal. However, when Li is replaced with the element $M^2$, the amount of Li available for charge/discharge decreases. As a result, the battery capacity lowers.

On the other hand, when both element $M^1$ and element $M^2$ are included in the crystal of the positive electrode active material, the element $M^1$ stabilizes the introduction of the element $M^2$ into the Ni layer for substitution. Hence, both elements are efficiently introduced into the Ni layer. This is because the element $M^1$ becomes trivalent or more in the crystal, thereby resulting in a reduction in the deviation from the electrical neutrality of the crystal caused by the addition of the element $M^2$.

The positive electrode active material needs to contain suitable amounts of Co and Al in order to improve thermal stability. Also, the element $M^1$ and the element $M^2$ do not contribute to battery capacity, or contribute a little. Thus, in order to secure capacity, it is desirable to minimize the amount of the element $M^1$ and the element $M^2$ added to the positive electrode active material. Hence, the formula 1 is required to satisfy $0.97 \leq x \leq 1.1$, $0.05 \leq y \leq 0.35$, $0.005 \leq z \leq 0.1$, $0.0001 \leq v \leq 0.05$, and $0.0001 \leq w \leq 0.05$. It should be noted that the range of x representing the Li content is values before charge/discharge (i.e., immediately after the synthesis of the composite oxide). When the battery is charged/discharged, the value x changes beyond the above range.

When the value y representing the Co content is less than 0.05, the effect of improving the thermal stability of the positive electrode active material cannot be obtained. If it exceeds 0.35, the high capacity advantage of the lithium nickel oxide cannot be fully utilized. The preferable range of the value y is $0.10 \leq y \leq 0.30$, and the more preferable range is $0.12 \leq y \leq 0.20$.

If the value z representing the Al content is less than 0.005, the effect of improving the thermal stability of the positive electrode active material cannot be obtained. If it exceeds 0.1, the high capacity advantage of the lithium nickel oxide cannot be fully utilized. The preferable range of the value z is $0.01 \leq z \leq 0.08$, and the more preferable range is $0.02 \leq z \leq 0.06$.

If the value v representing the content of the element M1 is less than 0.0001, the effect of improving the crystal stability of the positive electrode active material during charge cannot be obtained. If it exceeds 0.05, the high capacity advantage of the lithium nickel oxide cannot be fully utilized. The preferable range of the value v is $0.0005 \leq v \leq 0.02$, and the more preferable range is $0.0015 \leq v \leq 0.015$.

If the value w representing the content of the element $M^2$ is less than 0.0001, the effect of improving the crystal stability of the positive electrode active material during charge cannot be obtained. If it exceeds 0.05, the high capacity advantage of the lithium nickel oxide cannot be fully utilized. The preferable range of the value w is $0.0005 \leq w \leq 0.2$, and the more preferable range is $0.0015 \leq w \leq 0.015$.

The element $M^1$ is at least one selected from the group consisting of Mn, Ti, Y, Nb, Mo, and W. They may be contained in the positive electrode active material singly or in combination of two or more of them.

The element $M^2$ is so-called alkaline-earth metal and includes at least two selected from the group consisting of Mg, Ca, Sr, and Ba. It should be noted that the positive electrode active material includes both Mg and Ca as essential elements. That is, the positive electrode active material may include only Mg and Ca as the element $M^2$, and may further include Sr and/or Ba. The ratio of the essential elements (Mg and Ca) to the element $M^2$ is desirably 50 atomic percent or more. Since the ion radius of Mg and Ca is closer to the ion radius of Ni, it is believed that the inclusion of larger amounts of Mg and Ca results in an improvement in crystal stability.

In order to promote the improvement of crystal stability, the ratio of the content of the element $M^1$ to the content of the element $M^2$: v/w preferably satisfies $0.1 \leq v/w \leq 10$.

The coexistence of Mg and Ca enhances the effect of improving crystal stability, although the reason is not clear. The atom number w1 of Mg and the atom number w2 of Ca contained in the positive electrode active material preferably satisfy the relation: $2 \leq w1/w2 \leq 20$, and more preferably satisfy the relation: $5 \leq w1/w2 \leq 15$. Since the ion radius of Mg is closer to the ion radius of Ni, it is believed that the inclusion of a larger amount of Mg than Ca leads to an improvement in crystal stability.

In order to improve crystal stability, it is effective to increase the amounts of the elements $M^1$ and $M^2$ added. However, if the added amounts of the element $M^1$ and the element $M^2$ are increased, it is believed that the element $M^1$ and the element $M^2$ are partially substituted for the Li layer. As a result, the Li occupancy in the Li site of crystal of the composite oxide lowers, so that the capacity decreases. In order to obtain sufficient capacity, the Li occupancy is preferably 97.0% or more.

As used herein, Li occupancy refers to the proportion that Li occupies of the Li site of the Li layer in the crystal structure of $LiNiO_2$, without being replaced by another element. Li occupancy can be determined by Rietveld analysis.

As used herein, Rietveld analysis is a technique in which a crystal structure model is assumed and an X-ray diffraction pattern derived from the crystal structure model is refined so as to match the actually measured X-ray diffraction pattern. Refinement as used herein refers to changing various parameters of the crystal structure model (lattice constants, Li occupancy, etc.) based on the actually measured X-ray diffraction pattern.

In the composite oxide used as the positive electrode active material of the present invention, the BET specific surface area as measured by nitrogen gas adsorption is desirably 0.2 $m^2/g$ or more and 1.5 $m^2/g$ or less, and more desirably 0.4 $m^2/g$ or more and 1.3 $m^2/g$ or less, in order to improve storage characteristics. To achieve this, the mean particle size of primary particles of the composite oxide needs to be controlled at 0.1 μm or more and 3 μm or less, and the mean particle size of the secondary particles formed by aggregation of the primary particles needs to be controlled at 8 μm or more and 20 μm or less. By controlling the particle size in this manner, the composite oxide has an appropriate specific surface area, so that side reaction occurring at the interface between the positive electrode active material and the non-aqueous electrolyte is suppressed, thereby resulting in a large improvement in high-temperature storage characteristics.

If the mean particle size of the primary particles is less than 0.1 μm, the specific surface area of the composite oxide is too large, so that it is difficult to suppress the side reaction occurring at the interface between the positive electrode active material and the non-aqueous electrolyte. Also, if the mean particle size of the primary particles exceeds 3 μm, the primary particles are unable to form secondary particles. The preferable range of mean particle size of the primary particles is 0.3 μm or more and 2 μm or less.

If the mean particle size of the secondary particles is less than 8 μm, the specific surface area of the positive electrode active material becomes too large, so that it is difficult to suppress the side reaction occurring at the interface between the positive electrode active material and the non-aqueous electrolyte. Also, if the mean particle size of the secondary particles exceeds 20 μm, it is difficult to obtain sufficient charge/discharge characteristics. The preferable range of mean particle size of the secondary particles is 10 μm or more and 15 μm or less.

The tap density of the composite oxide is preferably 2.2 $g/cm^3$ or more and 2.8 $g/cm^3$ or less, and more preferably 2.3 $g/cm^3$ or more and 2.7 $g/cm^3$ or less.

In order to obtain a positive electrode active material having such mean particle size, it is effective to prepare a composite oxide by the following method.

First, a hydroxide represented by the formula 2: $Ni_{1-y-v-w}Co_yM^1_vM^2_w(OH)_2$ is prepared (step a). That is, this hydroxide is prepared as a precursor and is converted to a desired oxide. It is important not to include Al in the hydroxide. If the hydroxide contains Al, it is significantly difficult to control the particle size of the hydroxide as described above. It is thus impossible to obtain a positive electrode active material with excellent high-temperature storage characteristics.

After the preparation of the hydroxide, an Al-containing compound is added to the hydroxide to obtain a first composition (step b). The first composition is baked in an oxidizing atmosphere to obtain a first oxide (step c). Subsequently, a Li-containing compound is added to the first oxide to obtain a second composition (step d). The second composition is baked in an oxidizing atmosphere to obtain a lithium-containing composite oxide represented by the formula 1 (second oxide) (step e). According to this method, a positive electrode active material having a mean particle size of primary particles of 0.1 µm or more and 3 µm or less and a mean particle size of secondary particles of 8 µm or more and 20 µm or less can be easily obtained. That is, a composite oxide having a BET specific surface area, as measured by nitrogen gas adsorption, of 0.2 m$^2$/g or more and 1.5 m$^2$/g or less can be easily obtained. It is also easy to control the tap density of the composite oxide at 2.2 g/cm$^3$ or more and 2.8 g/cm$^3$ or less.

In the case of preparing an Al-containing hydroxide beforehand, adding a Li-containing compound thereto, and baking the resulting composition in an oxygen atmosphere, it is usually impossible to obtain a composite oxide having such particle size and BET specific surface area as described above. To obtain a composite oxide having the above-mentioned physical properties, it is necessary to bake a hydroxide represented by the formula 2 in an oxidizing atmosphere and add Al to the resulting oxide.

The mean particle size (D1) of primary particles of a composite oxide can be determined, for example, in the following manner. First, a positive electrode active material solidified with epoxy resin or the like is cut by a focused ion beam (FIB) or the like. A section is observed with a secondary ion microscope (SIM) to measure the secondary ion image of the composite oxide particles. Using any given 100 primary particles observed, the maximum diameter (maximum width: $D_{max}$) and the minimum diameter (minimum width: $D_{min}$) are obtained, and the average value thereof is obtained as the particle size ($D_n$) of each primary particle ($D_n=(D_{max}+D_{min})/2$). The mean particle size (D1) of the primary particles is obtained as the average value of particle sizes $D_n$ of the 100 primary particles (($D_1+D_2+ \ldots +D_{100}$)/100).

At this time, there is a high possibility that small particles may not have been cut along the diameter of the substantially spherical primary particles. It is thus preferable that the 100 primary particles whose average value is obtained not include particles that are smaller than a predetermined particle size. Specifically, among particle size data (particle size distribution) of the measured primary particles, only data about the largest 30% particle sizes is preferably used to obtain mean particle size.

Also, the mean particle size (D2) of secondary particles can be obtained as a volume basis median diameter by analyzing the composite oxide by using, for example, a laser diffraction particle size distribution analyzer.

The method for producing a positive electrode active material is hereinafter described in detail.

(i) Step a

The preparation method of a hydroxide represented by the formula 2 is not particularly limited, but is preferably a coprecipitation method in which an alkaline aqueous solution is injected to a raw material aqueous solution of a Ni compound, a Co compound, a compound of the element M$^1$, and a compound of the element M$^2$ to precipitate a hydroxide. Thus, the coprecipitation method is described below.

In the coprecipitation method, the following raw materials can be used.

As the Ni compound, nickel sulfate, nickel nitrate, nickel chloride, etc. can be used. They may be used singly or in combination. Among them, particularly nickel sulfate is preferred.

As the Co compound, cobalt sulfate, cobalt nitrate, cobalt chloride, etc. can be used. They may be used singly or in combination. Among them, particularly cobalt sulfate is preferred.

As the compound of the element M$^1$, a sulfate, nitrate, chloride, etc. can be used. For example, as the Mn compound, manganese sulfate, manganese chloride, manganese nitrate, etc. can be used, and particularly manganese sulfate is preferred. As the Ti compound, basic titanium sulfate, titanium tetrachloride, etc. can be used, and particularly basic titanium sulfate is preferred. As the Y compound, for example, yttrium nitrate can be used. As the Nb compound, niobium nitrate, potassium niobate, etc. can be used. As the Mo compound, sodium molybdate, ammonium molybdate, etc. can be used. As the W compound, sodium tungstate, ammonium tungstate, etc. can be used. A double salt containing two or more kinds of the element M$^1$ can also be used.

As the compound of the element M$^2$, a sulfate, nitrate, carbonate, etc. can also be used. For example, as the Mg compound, magnesium sulfate, magnesium nitrate, magnesium chloride, magnesium fluoride, magnesium acetate, etc. can be used. As the Ca compound, calcium hydroxide, calcium chloride, etc. can be used. As the Sr compound, strontium hydroxide, strontium chloride, etc. can be used. As the Ba compound, barium hydroxide, barium chloride, etc. can be used. A double salt containing two or more kinds of the element M$^2$ can also be used.

The alkali concentration of the alkaline aqueous solution injected into the raw material aqueous solution of a Ni compound, a Co compound, a compound of the element M$^1$, and a compound of the element M$^2$ is, for example, 10 to 50% by weight. As the alkali dissolved in the alkaline aqueous solution, sodium hydroxide, potassium hydroxide, lithium hydroxide, etc. can be used.

The temperature of the raw material aqueous solution and the alkaline aqueous solution is not particularly limited, but is, for example, 20 to 60° C.

When the alkaline aqueous solution is continuously dropped into the raw material aqueous solution such that the pH of the aqueous solution is, e.g., 10.5 or more, a hydroxide can be obtained as a coprecipitate of Ni, Co, the element M$^1$, and the element M$^2$. This hydroxide is filtered, washed with water, and dried, to obtain a hydroxide represented by the formula 2. The mean particle size of secondary particles of the hydroxide obtained is approximately 8 to 20 µm. The mean particle size of secondary particles of the hydroxide can be controlled by changing such conditions as the pH on reaction, the dropping speed of the raw material solution, etc. It should be noted that when the raw material aqueous solution contains Al ions, it is difficult to obtain a hydroxide having a mean particle size of secondary particles of 8 µm or more.

(ii) Step b

An Al-containing compound is added to the hydroxide represented by the formula 2 and obtained in the step a. By adding Al to the hydroxide in this step, the particle size of primary and secondary particles of the finally obtained composite oxide can be controlled in a desired range. It also becomes easy to control BET specific surface area and tap density.

The Al-containing compound may be added by any method, but it is preferable to evenly attach Al to the surface of the hydroxide represented by the formula 2. It is preferable, for example, to add NaAlO$_2$ to the hydroxide represented by the formula 2 that is being stirred in water, and then adjust the pH of the water to 10 to 8 with an acid. As the acid added thereto, for example, sulfuric acid, hydrochloric acid, or nitric acid can be used. Thereafter, the powder obtained is dried by removing the moisture. By using such a liquid phase reaction, aluminum hydroxide or basic aluminum hydroxide can be evenly precipitated as the Al-containing compound on the surface of the hydroxide represented by the formula 2.

In addition to the above-mentioned method of using a liquid phase reaction, the hydroxide represented by the formula 2 may be simply mixed with aluminum hydroxide, aluminum oxide, aluminum nitrate, aluminum fluoride, aluminum chloride, or the like as the Al-containing compound.

(ii) Step c

The hydroxide with the Al-containing compound added thereto (first composition) is baked in an oxidizing atmosphere (e.g., in air or oxygen). The baking is preferably performed at 500° C. or more and 1100° C. or less, and more preferably 600° C. or more and 1000° C. or less. The baking time is preferably, for example, 1 to 10 hours, although it depends on the baking temperature.

(iii) Step d

A Li-containing compound is added to the oxide obtained by the above baking (first oxide). The Li-containing compound may be added by any method and, for example, the Li-containing compound may be simply mixed with the first oxide.

As the lithium-containing compound, lithium carbonate, lithium hydroxide, lithium nitrate, lithium sulfate, lithium oxide, etc. can be used. Among them, lithium carbonate and lithium hydroxide are most advantageous in terms of environmental concerns and costs. The mean particle size of the lithium-containing compound is preferably 5 μm or less. If the mean particle size of the lithium-containing compound is too large, the reaction may not proceed evenly.

(iv) Step e

The first oxide with the Li-containing compound added thereto (second composition) is baked in an oxidizing atmosphere (e.g., in air or oxygen). The baking is preferably performed at 600° C. or more and 850° C. or less, and more preferably 700° C. or more and 800° C. or less. The baking time is preferably, for example, 5 to 72 hours, although it depends on the baking temperature.

The baking is preferably performed in two stages. It is preferable to preliminarily bake at 400° C. or more and 550° C. or less, for example, for about 1 to 10 hours and then bake at 700° C. or more and 800° C. or less. Such a two-stage baking method can provide a highly crystalline active material while reducing unreacted material.

The above method can easily provide a positive electrode active material comprising a composite oxide that is represented by the formula 1 with a mean particle size of primary particles of 0.1 μm or more and 3 μm or less and a mean particle size of secondary particles of 8 μm or more and 20 μm or less.

The non-aqueous electrolyte secondary battery of the present invention is characterized by its positive electrode active material, and other constituent elements are not particularly limited.

The positive electrode usually comprises a positive electrode core member and a positive electrode material mixture carried thereon. The positive electrode material mixture can contain a binder, a conductive agent, etc., in addition to a positive electrode active material. Preferable examples of binders include fluorocarbon resin, such as polyvinylidene fluoride and polytetrafluoroethylene, and particles of rubber such as modified acrylonitrile rubber, but there is no particular limitation. Preferable examples of conductive agents include carbon black such as acetylene black and ketjen black and various graphites, but there is no particular limitation.

The negative electrode usually comprises a negative electrode core member and a negative electrode material mixture carried thereon. The negative electrode material mixture usually contains a negative electrode active material and a binder, and if necessary, contains a conductive agent, etc. Examples of negative electrode active materials include various natural graphites, various artificial graphites, carbon materials such as amorphous carbon, silicon-containing composite materials such as silicide, and various alloy materials. Preferable examples of binders include fluorocarbon resin, such as polyvinylidene fluoride and modified polyvinylidene fluoride, and particles of rubber such as styrene butadiene rubber, but there is no particular limitation. The same conductive agents as those for the positive electrode can also be used.

The separator is typically a microporous film made of polyolefin resin such as polyethylene or polypropylene, but there is no particular limitation. The microporous film may be a mono-layer film made of one kind of polyolefin resin and may be a multi-layer film made of two or more kinds of polyolefin resin.

The non-aqueous electrolyte used comprises a non-aqueous solvent and a lithium salt dissolved therein. Examples of non-aqueous solvents include ethylene carbonate, propylene carbonate, dimethyl carbonate, diethyl carbonate, ethyl methyl carbonate, and γ-butyrolactone, but there is no particular limitation. It is preferable to use two or more kinds of non-aqueous solvents. Preferable examples of lithium salts include lithium hexafluorophosphate ($LiPF_6$) and lithium tetrafluoroborate ($LiBF_4$), but there is no particular limitation. It is preferable that the non-aqueous electrolyte include an additive such as vinylene carbonate, cyclohexyl benzene, or diphenyl ether.

The present invention is hereinafter described specifically by way of Examples, but the following Examples are not to be construed as limiting the present invention.

EXAMPLE 1

Composite oxides having the compositions and physical properties Nos. 1 to 31 as shown in Tables 1 to 4 were prepared as positive electrode active materials by the following method. Using them, batteries 1 to 31 were produced.

(i) Preparation of Positive Electrode Active Material

Step a

A metal salt aqueous solution of nickel sulfate, cobalt sulfate, a salt of the element $M^1$, and a salt of the element $M^2$ was prepared. The concentration of nickel sulfate in the metal salt aqueous solution was set to 1 mol/L, and the concentrations of the other salts were adjusted according to Table 1.

The metal salt aqueous solution was maintained at 50° C. while being stirred. An aqueous solution containing 30% by weight of sodium hydroxide was dropped thereinto so as to achieve a pH of 12 so that a hydroxide was precipitated. The precipitate of the hydroxide was filtered, washed with water, and dried in air.

As the salt of the element $M^1$, manganese sulfate, basic titanium sulfate, yttrium nitrate, potassium niobate, sodium molybdate, or sodium tungstate was used. As the salt of the element $M^2$, magnesium sulfate and calcium sulfate were used in a molar ratio of 9:1.

Step b

The hydroxide obtained was stirred in water in a reaction vessel at 30° C., and $NaAlO_2$ was added into the reaction vessel such that the amount of Al was that as shown in Table 1. After sufficient stirring, the water was neutralized with sulfuric acid until the pH inside the reaction vessel became 9. As a result, aluminum hydroxide serving as an Al-containing compound was evenly precipitated on the surface of the hydroxide. Thereafter, the power obtained was dried by removing the moisture.

Step c

The hydroxide with the Al-containing compound carried thereon (first composition) was baked at 700° C. in an air atmosphere for 10 hours, to obtain a first oxide.

Step d

The first oxide was mixed with lithium hydroxide such that the molar ratio of Li:(Ni+Co+Al+element $M^1$+element $M^2$) was 1:1, to obtain a second composition.

Step e

Using an electric furnace, the second composition was heated to 750° C. in an oxygen atmosphere for 10 hours, and then baked at 750° C. for 36 hours to synthesize a positive electrode active material.

In Nos. 23 to 31, by changing the synthesis condition of the raw material hydroxide and the baking temperature of the second composition, the mean particle size D1 of primary particles of the composite oxide or the mean particle size D2 of the secondary particles were changed.

(ii) Preparation of Positive Electrode

A paste containing a positive electrode material mixture was prepared by mixing 100 parts by weight of a predetermined positive electrode active material, 4 parts by weight of acetylene black serving as a conductive agent, and a solution prepared by dissolving 5 parts by weight of polyvinylidene fluoride (PVDF) as a binder in a solvent of N-methylpyrrolidone (NMP). This paste was applied onto both sides of a 15-μm-thick aluminum foil serving as a current collector, dried, rolled, and cut to predetermined dimensions to obtain a positive electrode.

(ii) Preparation of Negative Electrode

A paste containing a negative electrode material mixture was prepared by mixing 100 parts by weight of artificial flake graphite which has been crushed and classified to a mean particle size of approximately 20 μm with 3 parts by weight of styrene/butadiene rubber serving as a binder and 100 parts by weight of an aqueous solution containing 1% by weight of carboxymethyl cellulose. This paste was applied onto both sides of a 10-μm-thick copper foil serving as a current collector, dried, rolled, and cut to predetermined dimensions to obtain a negative electrode.

(iii) Assembly of Battery

The predetermined positive electrode and the above-mentioned negative electrode were assembled into a prismatic non-aqueous electrolyte secondary battery (width 34 mm, height 50 mm, thickness 5.2 mm, design capacity 950 mAh). FIG. 1 is a partially cut-away perspective view of the prismatic battery produced in this example.

This battery was assembled as follows. First, the predetermined positive electrode and the above-mentioned negative electrode were wound together with a 20-μm thick microporous polyethylene resin separator interposed therebetween, to fabricate an electrode plate group 1. An aluminum positive electrode lead 2 and a nickel negative electrode lead 3 were welded to the positive electrode and the negative electrode, respectively. A polyethylene resin insulating ring (not shown) was fitted to an upper part of the electrode plate group 1, which was then placed in an aluminum battery case 4. The other end of the positive electrode lead 2 was spot welded to an aluminum sealing plate 5. Also, the other end of the negative electrode lead 3 was spot welded to a lower part of a nickel negative electrode terminal 6, which was disposed in the central part of the sealing plate 5 and surrounded with insulating resin 7. The open edge of the battery case 4 and the circumference of the sealing plate 5 were laser welded together, and a predetermined amount of a non-aqueous electrolyte was injected therein from the liquid inlet of the sealing plate. The non-aqueous electrolyte used was prepared by dissolving $LiPF_6$ at a concentration of 1.0 mol/L in a solvent mixture of ethylene carbonate and ethyl methyl carbonate in a volume ratio of 1:3 with 1 wt % of vinylene carbonate added thereto. Lastly, the liquid inlet was covered with an aluminum sealing stopper 8 and laser welded for sealing. In this way, the battery was completed.

TABLE 1

| | | $Li_xNi_{1-y-z-v-w}Co_yAl_zM^1_vM^2_wO_2$ | | | | | |
|---|---|---|---|---|---|---|---|
| | No. | $M^1$ | $M^2$ | x | y | z | v | w |
| Example | 1 | Mn | Mg, Ca | 1 | 0.15 | 0.03 | 0.005 | 0.005 |
| Example | 2 | Ti | Mg, Ca | 1 | 0.15 | 0.03 | 0.005 | 0.005 |
| Example | 3 | Y | Mg, Ca | 1 | 0.15 | 0.03 | 0.005 | 0.005 |
| Example | 4 | Nb | Mg, Ca | 1 | 0.15 | 0.03 | 0.005 | 0.005 |
| Example | 5 | Mo | Mg, Ca | 1 | 0.15 | 0.03 | 0.005 | 0.005 |
| Example | 6 | W | Mg, Ca | 1 | 0.15 | 0.03 | 0.005 | 0.005 |
| Comp. Example | 7 | Mn | Mg, Ca | 1 | 0.01 | 0.03 | 0.005 | 0.005 |
| Example | 8 | Mn | Mg, Ca | 1 | 0.05 | 0.03 | 0.005 | 0.005 |
| Example | 9 | Mn | Mg, Ca | 1 | 0.10 | 0.03 | 0.005 | 0.005 |
| Example | 10 | Mn | Mg, Ca | 1 | 0.12 | 0.03 | 0.005 | 0.005 |
| Example | 11 | Mn | Mg, Ca | 1 | 0.20 | 0.03 | 0.005 | 0.005 |
| Example | 12 | Mn | Mg, Ca | 1 | 0.30 | 0.03 | 0.005 | 0.005 |
| Example | 13 | Mn | Mg, Ca | 1 | 0.35 | 0.03 | 0.005 | 0.005 |
| Comp. Example | 14 | Mn | Mg, Ca | 1 | 0.50 | 0.03 | 0.005 | 0.005 |

In the element $M^2$, Mg:Ca = 9:1 (Atomic ratio)

TABLE 2

| | | Physical properties | | | | |
|---|---|---|---|---|---|---|
| | No. | D1 (μm) | D2 (μm) | S (m²/g) | T (g/cm³) | O (%) |
| Example | 1 | 0.57 | 10.8 | 0.48 | 2.53 | 98.12 |
| Example | 2 | 0.15 | 10.5 | 0.52 | 2.42 | 98.02 |
| Example | 3 | 0.42 | 11.2 | 0.42 | 2.64 | 98.08 |
| Example | 4 | 0.48 | 10.3 | 0.55 | 2.4 | 97.86 |
| Example | 5 | 0.22 | 10.4 | 0.51 | 2.4 | 98.24 |
| Example | 6 | 0.36 | 11.0 | 0.45 | 2.57 | 97.94 |
| Comp. Example | 7 | 0.36 | 9.7 | 0.62 | 2.35 | 97.24 |
| Example | 8 | 0.42 | 9.9 | 0.58 | 2.39 | 97.57 |
| Example | 9 | 0.47 | 10.2 | 0.50 | 2.41 | 97.72 |
| Example | 10 | 0.49 | 10.0 | 0.52 | 2.38 | 97.84 |
| Example | 11 | 0.60 | 10.5 | 0.49 | 2.47 | 98.22 |
| Example | 12 | 0.71 | 10.2 | 0.51 | 2.45 | 98.26 |
| Example | 13 | 0.76 | 11.3 | 0.42 | 2.62 | 98.24 |
| Comp. Example | 14 | 0.82 | 12.4 | 0.38 | 2.68 | 98.36 |

D1: Mean particle size of primary particles (μm)
D2: Mean particle size of secondary particles (μm)
S: BET specific surface area (m²/g)
T: Tap density (g/cm³)
O: Li occupancy (%)

TABLE 3

| | | $Li_xNi_{1-y-z-v-w}Co_yAl_zM^1_vM^2_wO_2$ | | | | | |
|---|---|---|---|---|---|---|---|
| | No. | $M^1$ | $M^2$ | x | y | z | v | w |
| Comp. Example | 15 | Mn | Mg, Ca | 1 | 0.15 | 0.001 | 0.005 | 0.005 |
| Example | 16 | Mn | Mg, Ca | 1 | 0.15 | 0.005 | 0.005 | 0.005 |
| Example | 17 | Mn | Mg, Ca | 1 | 0.15 | 0.01 | 0.005 | 0.005 |
| Example | 18 | Mn | Mg, Ca | 1 | 0.15 | 0.02 | 0.005 | 0.005 |
| Example | 19 | Mn | Mg, Ca | 1 | 0.15 | 0.06 | 0.005 | 0.005 |
| Example | 20 | Mn | Mg, Ca | 1 | 0.15 | 0.08 | 0.005 | 0.005 |
| Example | 21 | Mn | Mg, Ca | 1 | 0.15 | 0.1 | 0.005 | 0.005 |
| Comp. Example | 22 | Mn | Mg, Ca | 1 | 0.15 | 0.2 | 0.005 | 0.005 |
| Example | 23 | Mn | Mg, Ca | 1 | 0.15 | 0.03 | 0.005 | 0.005 |
| Example | 24 | Mn | Mg, Ca | 1 | 0.15 | 0.03 | 0.005 | 0.005 |
| Example | 25 | Mn | Mg, Ca | 1 | 0.15 | 0.03 | 0.005 | 0.005 |
| Example | 26 | Mn | Mg, Ca | 1 | 0.15 | 0.03 | 0.005 | 0.005 |
| Comp. Example | 27 | Mn | Mg, Ca | 1 | 0.15 | 0.03 | 0.005 | 0.005 |
| Example | 28 | Mn | Mg, Ca | 1 | 0.15 | 0.03 | 0.005 | 0.005 |
| Example | 29 | Mn | Mg, Ca | 1 | 0.15 | 0.03 | 0.005 | 0.005 |
| Example | 30 | Mn | Mg, Ca | 1 | 0.15 | 0.03 | 0.005 | 0.005 |
| Comp. Example | 31 | Mn | Mg, Ca | 1 | 0.15 | 0.03 | 0.005 | 0.005 |

In the element $M^2$, Mg:Ca = 9:1 (Atomic ratio)

TABLE 4

| No. | D1 (μm) | D2 (μm) | S (m²/g) | T (g/cm³) | O (%) |
|---|---|---|---|---|---|
| Comp. Example 15 | 0.60 | 10.3 | 0.53 | 2.37 | 98.09 |
| Example 16 | 0.58 | 11.2 | 0.44 | 2.55 | 98.18 |
| Example 17 | 0.56 | 10.6 | 0.49 | 2.5 | 98.08 |
| Example 18 | 0.53 | 10.1 | 0.52 | 2.41 | 98.10 |
| Example 19 | 0.55 | 11.3 | 0.43 | 2.51 | 97.96 |
| Example 20 | 0.52 | 10.8 | 0.49 | 2.56 | 97.84 |
| Example 21 | 0.48 | 9.8 | 0.56 | 2.39 | 97.80 |
| Comp. Example 22 | 0.42 | 8.7 | 0.69 | 2.31 | 97.45 |
| Example 23 | 0.10 | 9.8 | 1.5 | 2.28 | 98.14 |
| Example 24 | 0.29 | 10.1 | 1.27 | 2.34 | 98.22 |
| Example 25 | 2.02 | 11.3 | 0.39 | 2.71 | 97.94 |
| Example 26 | 2.98 | 12.6 | 0.28 | 2.82 | 97.64 |
| Comp. Example 27 | 3.52 | 13.4 | 0.15 | 2.89 | 97.3 |
| Example 28 | 0.46 | 8 | 0.85 | 2.19 | 98.06 |
| Example 29 | 0.52 | 15.1 | 0.29 | 2.68 | 98.09 |
| Example 30 | 0.54 | 19.8 | 0.20 | 2.80 | 97.78 |
| Comp. Example 31 | 0.78 | 23.7 | 0.18 | 2.88 | 97.32 |

D1: Mean particle size of primary particles (μm)
D2: Mean particle size of secondary particles (μm)
S: BET specific surface area (m²/g)
T: Tap density (g/cm³)
O: Li occupancy (%)

COMPARATIVE EXAMPLE 1

Composite oxides having the compositions and physical properties No. 32 to 37 as shown in Tables 5 to 6 were prepared as positive electrode active materials by the following method. Using them, batteries 32 to 37 were produced in the same manner as in Example 1.

(i) Preparation of Positive Electrode Active Material

A metal salt aqueous solution of nickel sulfate, cobalt sulfate, aluminum sulfate, a salt of the element $M^1$, and a salt of the element $M^2$ was prepared. The concentration of nickel sulfate in the metal salt aqueous solution was set to 1 mol/L, and the concentrations of the other salts were adjusted according to Table 5.

The metal salt aqueous solution was maintained at 50° C. while being stirred. An aqueous solution containing 30% by weight of sodium hydroxide was dropped thereinto so as to achieve a pH of 12 so that a hydroxide was precipitated. The precipitate of the hydroxide was filtered, washed with water, and dried in air.

As the salt of the element $M^1$, manganese sulfate, basic titanium sulfate, yttrium nitrate, potassium niobate, sodium molybdate, or sodium tungstate was used. As the salt of the element $M^2$, magnesium sulfate and calcium sulfate were used in a molar ratio of 9:1.

The hydroxide obtained and lithium hydroxide were mixed together such that the molar ratio of Li:(Ni+Co+Al+element $M^1$+element $M^2$) was 1:1. Using an electric furnace, the resulting composition was heated to 750° C. in an oxygen atmosphere for 10 hours and baked at 750° C. for 36 hours to synthesize a positive electrode active material.

TABLE 5

$Li_xNi_{1-y-z-v-w}Co_yAl_zM^1_vM^2_wO_2$

| No. | $M^1$ | $M^2$ | x | y | z | v | w |
|---|---|---|---|---|---|---|---|
| Comp. Example 32 | Mn | Mg, Ca | 1 | 0.15 | 0.03 | 0.005 | 0.005 |
| Comp. Example 33 | Ti | Mg, Ca | 1 | 0.15 | 0.03 | 0.005 | 0.005 |
| Comp. Example 34 | Y | Mg, Ca | 1 | 0.15 | 0.03 | 0.005 | 0.005 |
| Comp. Example 35 | Nb | Mg, Ca | 1 | 0.15 | 0.03 | 0.005 | 0.005 |
| Comp. Example 36 | Mo | Mg, Ca | 1 | 0.15 | 0.03 | 0.005 | 0.005 |
| Comp. Example 37 | W | Mg, Ca | 1 | 0.15 | 0.03 | 0.005 | 0.005 |

In the element $M^2$, Mg:Ca = 9:1 (Atomic ratio)

TABLE 6

| No. | D1 (μm) | D2 (μm) | S (m²/g) | T (g/cm³) | O (%) |
|---|---|---|---|---|---|
| Comp. Example 32 | 0.08 | 4.8 | 2.10 | 1.85 | 97.99 |
| Comp. Example 33 | 0.05 | 3.7 | 2.45 | 1.67 | 97.67 |
| Comp. Example 34 | 0.07 | 3.9 | 2.23 | 1.72 | 97.85 |
| Comp. Example 35 | 0.06 | 4.1 | 2.39 | 1.96 | 97.86 |
| Comp. Example 36 | 0.08 | 5.8 | 1.96 | 2.05 | 97.45 |
| Comp. Example 37 | 0.07 | 4.6 | 2.08 | 1.80 | 97.69 |

D1: Mean particle size of primary particles (μm)
D2: Mean particle size of secondary particles (μm)
S: BET specific surface area (m²/g)
T: Tap density (g/cm³)
O: Li occupancy (%)

EXAMPLE 2

Composite oxides were prepared in the same manner as in Example 1, except that the composition and physical properties of the positive electrode active materials were changed to those of Nos. 38 to 45 shown in Tables 7 and 8. Using them, batteries 38 to 45 were produced in the same manner as in Example 1.

TABLE 7

$Li_xNi_{1-y-z-v-w}Co_yAl_zM^1_vM^2_wO_2$

| | No. | $M^1$ | $M^2$ | x | y | z | v | w | v/w |
|---|---|---|---|---|---|---|---|---|---|
| Comp. Example | 38 | Mn | Mg, Ca | 1 | 0.15 | 0.03 | 0.00005 | 0.005 | 0.01 |
| Example | 39 | Mn | Mg, Ca | 1 | 0.15 | 0.03 | 0.0001 | 0.005 | 0.02 |
| Example | 40 | Mn | Mg, Ca | 1 | 0.15 | 0.03 | 0.0005 | 0.005 | 0.1 |
| Example | 41 | Mn | Mg, Ca | 1 | 0.15 | 0.03 | 0.0015 | 0.005 | 0.3 |
| Example | 42 | Mn | Mg, Ca | 1 | 0.15 | 0.03 | 0.015 | 0.005 | 3 |

TABLE 7-continued

| | No. | $M^1$ | $M^2$ | x | y | z | v | w | v/w |
|---|---|---|---|---|---|---|---|---|---|
| Example | 43 | Mn | Mg, Ca | 1 | 0.15 | 0.03 | 0.02 | 0.005 | 4 |
| Example | 44 | Mn | Mg, Ca | 1 | 0.15 | 0.03 | 0.05 | 0.005 | 10 |
| Comp. Example | 45 | Mn | Mg, Ca | 1 | 0.15 | 0.03 | 0.1 | 0.005 | 20 |

In the element $M^2$, Mg:Ca = 9:1 (Atomic ratio)

TABLE 8

| | | Physical properties | | | | |
|---|---|---|---|---|---|---|
| | No. | D1 (μm) | D2 (μm) | S (m²/g) | T (g/cm³) | O (%) |
| Comp. Example | 38 | 0.56 | 10.6 | 0.44 | 2.51 | 98.56 |
| Example | 39 | 0.57 | 10.2 | 0.46 | 2.49 | 98.42 |
| Example | 40 | 0.59 | 10.5 | 0.43 | 2.56 | 98.36 |
| Example | 41 | 0.53 | 10.4 | 0.46 | 2.53 | 98.24 |
| Example | 42 | 0.55 | 10.8 | 0.42 | 2.50 | 98.02 |
| Example | 43 | 0.58 | 10.6 | 0.47 | 2.54 | 97.92 |
| Example | 44 | 0.57 | 11.0 | 0.43 | 2.51 | 97.86 |
| Comp. Example | 45 | 0.49 | 9.8 | 0.49 | 2.48 | 97.46 |

D1: Mean particle size of primary particles (μm)
D2: Mean particle size of secondary particles (μm)
S: BET specific surface area (m²/g)
T: Tap density (g/cm³)
O: Li occupancy (%)

EXAMPLE 3

Composite oxides were prepared in the same manner as in Example 1, except that the composition and physical properties of the positive electrode active materials were changed to those of Nos. 46 to 53 shown in Tables 9 and 10. Using them, batteries 46 to 53 were produced in the same manner as in Example 1.

TABLE 9

| | | | | $Li_xNi_{1-y-z-v-w}Co_yAl_zM^1_vM^2_wO_2$ | | | | | |
|---|---|---|---|---|---|---|---|---|---|
| | No. | $M^1$ | $M^2$ | x | y | z | v | w | v/w |
| Comp. Example | 46 | Mn | Mg, Ca | 1 | 0.15 | 0.03 | 0.005 | 0.00005 | 100.00 |
| Example | 47 | Mn | Mg, Ca | 1 | 0.15 | 0.03 | 0.005 | 0.0001 | 50.00 |
| Example | 48 | Mn | Mg, Ca | 1 | 0.15 | 0.03 | 0.005 | 0.0005 | 10.00 |
| Example | 49 | Mn | Mg, Ca | 1 | 0.15 | 0.03 | 0.005 | 0.0015 | 3.33 |
| Example | 50 | Mn | Mg, Ca | 1 | 0.15 | 0.03 | 0.005 | 0.015 | 0.33 |
| Example | 51 | Mn | Mg, Ca | 1 | 0.15 | 0.03 | 0.005 | 0.02 | 0.25 |
| Example | 52 | Mn | Mg, Ca | 1 | 0.15 | 0.03 | 0.005 | 0.05 | 0.10 |
| Comp. Example | 53 | Mn | Mg, Ca | 1 | 0.15 | 0.03 | 0.005 | 0.1 | 0.05 |

In the element $M^2$, Mg:Ca = 9:1 (Atomic ratio)

TABLE 10

| | | Physical properties | | | | |
|---|---|---|---|---|---|---|
| | No. | D1 (μm) | D2 (μm) | S (m²/g) | T (g/cm³) | O (%) |
| Comp. Example | 46 | 0.54 | 10.4 | 0.42 | 2.57 | 98.62 |
| Example | 47 | 0.55 | 10.0 | 0.47 | 2.52 | 98.47 |
| Example | 48 | 0.53 | 10.6 | 0.41 | 2.61 | 98.41 |
| Example | 49 | 0.56 | 10.3 | 0.44 | 2.56 | 98.24 |
| Example | 50 | 0.52 | 10.5 | 0.43 | 2.54 | 97.67 |
| Example | 51 | 0.50 | 10.1 | 0.46 | 2.50 | 97.43 |
| Example | 52 | 0.46 | 9.7 | 0.52 | 2.48 | 97.05 |
| Comp. Example | 53 | 0.38 | 9.4 | 0.57 | 2.39 | 96.87 |

D1: Mean particle size of primary particles (μm)
D2: Mean particle size of secondary particles (μm)
S: BET specific surface area (m²/g)
T: Tap density (g/cm³)
O: Li occupancy (%)

EXAMPLE 4

Composite oxides were prepared in the same manner as in Example 1, except that the composition and physical properties of the positive electrode active materials were changed to those of Nos. 54 to 60 shown in Tables 11 and 12. Using them, batteries 54 to 60 were produced in the same manner as in Example 1.

TABLE 11

| | | | | $Li_xNi_{1-y-z-v-w1-w2}Co_yAl_zM^1_vMg_{w1}Ca_{w2}O_2$ | | | | | | |
|---|---|---|---|---|---|---|---|---|---|---|
| | No. | $M^1$ | $M^2$ | x | y | z | v | w1 + w2 (=w) | w1/w2 |
| Example | 54 | Mn | Mg, Ca | 1 | 0.15 | 0.03 | 0.005 | 0.005 | 1.1 |
| Example | 55 | Mn | Mg, Ca | 1 | 0.15 | 0.03 | 0.005 | 0.005 | 2.0 |

TABLE 11-continued $Li_xNi_{1-y-z-v-w1-w2}Co_yAl_zM^1_vMg_{w1}Ca_{w2}O_2$

| No. | $M^1$ | $M^2$ | x | y | z | v | $w^1+w^2$ (=w) | $w^1/w^2$ |
|---|---|---|---|---|---|---|---|---|
| Example 56 | Mn | Mg, Ca | 1 | 0.15 | 0.03 | 0.005 | 0.005 | 5.1 |
| Example 57 | Mn | Mg, Ca | 1 | 0.15 | 0.03 | 0.005 | 0.005 | 10.2 |
| Example 58 | Mn | Mg, Ca | 1 | 0.15 | 0.03 | 0.005 | 0.005 | 15.0 |
| Example 59 | Mn | Mg, Ca | 1 | 0.15 | 0.03 | 0.005 | 0.005 | 20.0 |
| Example 60 | Mn | Mg, Ca | 1 | 0.15 | 0.03 | 0.005 | 0.005 | 35.6 |

TABLE 12

| | | | Physical properties | | |
|---|---|---|---|---|---|
| No. | D1 (μm) | D2 (μm) | S (m²/g) | T (g/cm³) | O (%) |
| Example 54 | 0.57 | 10.8 | 0.48 | 2.53 | 98.03 |
| Example 55 | 0.54 | 11.2 | 0.46 | 2.58 | 97.96 |
| Example 56 | 0.55 | 10.7 | 0.44 | 2.49 | 97.87 |
| Example 57 | 0.53 | 10.3 | 0.45 | 2.51 | 98.11 |
| Example 58 | 0.56 | 10.6 | 0.46 | 2.55 | 98.24 |
| Example 59 | 0.58 | 11.0 | 0.43 | 2.52 | 98.18 |
| Example 60 | 0.61 | 10.4 | 0.47 | 2.51 | 98.09 |

D1: Mean particle size of primary particles (μm)
D2: Mean particle size of secondary particles (μm)
S: BET specific surface area (m²/g)
T: Tap density (g/cm³)
O: Li occupancy (%)

COMPARATIVE EXAMPLE 2

Composite oxides were prepared in the same manner as in Example 1, except that the composition and physical properties of the positive electrode active materials were changed to those of Nos. 61 to 65 shown in Tables 13 and 14. Using them, batteries 61 to 65 were produced in the same manner as in Example 1.

TABLE 13

$Li_xNi_{1-y-z-v-w}Co_yAl_zM^1_vM^2_wO_2$

| No. | $M^1$ | $M^2$ | x | y | z | v | w |
|---|---|---|---|---|---|---|---|
| Comp. Example 61 | — | — | 1 | 0.15 | 0.03 | 0 | 0 |
| Comp. Example 62 | Mn | — | 1 | 0.15 | 0.03 | 0.005 | 0 |
| Comp. Example 63 | — | Mg, Ca | 1 | 0.15 | 0.03 | 0 | 0.005 |
| Comp. Example 64 | Mn | Mg | 1 | 0.15 | 0.03 | 0.005 | 0.005 |
| Comp. Example 65 | Mn | Ca | 1 | 0.15 | 0.03 | 0.005 | 0.005 |

In the element $M^2$ of No. 63, Mg:Ca = 9:1 (Atomic ratio)

TABLE 14

| | | | Physical properties | | |
|---|---|---|---|---|---|
| No. | D1 (μm) | D2 (μm) | S (m²/g) | T (g/cm³) | O (%) |
| Comp. Example 61 | 0.55 | 10.6 | 0.39 | 2.50 | 99.02 |
| Comp. Example 62 | 0.48 | 10.3 | 0.42 | 2.48 | 98.86 |
| Comp. Example 63 | 0.39 | 9.6 | 0.52 | 2.38 | 98.72 |
| Comp. Example 64 | 0.51 | 9.8 | 0.48 | 2.41 | 98.27 |
| Comp. Example 65 | 0.53 | 10.1 | 0.45 | 2.49 | 98.38 |

D1: Mean particle size of primary particles (μm)
D2: Mean particle size of secondary particles (μm)
S: BET specific surface area (m²/g)
T: Tap density (g/cm³)
O: Li occupancy (%)

EXAMPLE 5

Composite oxides were prepared in the same manner as in Example 1, except that the composition and physical properties of the positive electrode active materials were changed to those of Nos. 66 to 67 shown in Tables 15 and 16. Using them, batteries 66 to 67 were produced in the same manner as in Example 1.

TABLE 15

$Li_xNi_{1-y-z-v-w}Co_yAl_zM^1_vM^2_wO_2$

| No. | $M^1$ | $M^2$ | x | y | z | v | w |
|---|---|---|---|---|---|---|---|
| Example 66 | Mn | Mg, Ca, Sr | 1 | 0.15 | 0.03 | 0.005 | 0.005 |
| Example 67 | Mn | Mg, Ca, Ba | 1 | 0.15 | 0.03 | 0.005 | 0.005 |

In the element $M^2$ of No. 66, Mg:Ca:Sr = 8:1:1 (Atomic ratio)
In the element $M^2$ of No. 67, Mg:Ca:Ba = 8:1:1 (Atomic ratio)

TABLE 16

| | | | Physical properties | | |
|---|---|---|---|---|---|
| No. | D1 (μm) | D2 (μm) | S (m²/g) | T (g/cm³) | O (%) |
| Example 66 | 0.56 | 11.2 | 0.38 | 2.62 | 98.14 |
| Example 67 | 0.51 | 10.6 | 0.47 | 2.53 | 98.06 |

D1: Mean particle size of primary particles (μm)
D2: Mean particle size of secondary particles (μm)
S: BET specific surface area (m²/g)
T: Tap density (g/cm³)
O: Li occupancy (%)

EXAMPLE 6

Composite oxides were prepared in the same manner as in Example 1, except that the composition and physical properties of the positive electrode active materials were changed to those of Nos. 68 to 72 shown in Tables 17 and 18. Using them, batteries 68 to 72 were produced in the same manner as in Example 1.

TABLE 17

$Li_xNi_{1-y-z-v-w}Co_yAl_zM^1_vM^2_wO_2$

| No. | $M^1$ | $M^2$ | x | y | z | v | w |
|---|---|---|---|---|---|---|---|
| Comp. Example 68 | Mn | Mg, Ca | 0.95 | 0.15 | 0.03 | 0.005 | 0.005 |
| Example 69 | Mn | Mg, Ca | 0.97 | 0.15 | 0.03 | 0.005 | 0.005 |
| Example 70 | Mn | Mg, Ca | 1.02 | 0.15 | 0.03 | 0.005 | 0.005 |

TABLE 17-continued $Li_xNi_{1-y-z-v-w}Co_yAl_zM^1{}_vM^2{}_wO_2$

| No. | $M^1$ | $M^2$ | x | y | z | v | w |
|---|---|---|---|---|---|---|---|
| Example 71 | Mn | Mg, Ca | 1.10 | 0.15 | 0.03 | 0.005 | 0.005 |
| Comp. Example 72 | Mn | Mg, Ca | 1.15 | 0.15 | 0.03 | 0.005 | 0.005 |

In the element $M^2$, Mg:Ca = 9:1 (Atomic ratio)

TABLE 18

| | Physical properties | | | | |
|---|---|---|---|---|---|
| No. | D1 (μm) | D2 (μm) | S (m²/g) | T (g/cm³) | O (%) |
| Comp. Example 68 | 0.15 | 8.2 | 1.45 | 2.24 | 94.89 |
| Example 69 | 0.32 | 9.4 | 0.76 | 2.36 | 97.02 |
| Example 70 | 0.54 | 11.3 | 0.42 | 2.58 | 98.06 |
| Example 71 | 0.57 | 12.1 | 0.39 | 2.60 | 98.14 |
| Comp. Example 72 | 0.62 | 12.5 | 0.32 | 2.63 | 98.26 |

D1: Mean particle size of primary particles (μm)
D2: Mean particle size of secondary particles (μm)
S: BET specific surface area (m²/g)
T: Tap density (g/cm³)
O: Li occupancy (%)

(Evaluation 1)

The physical properties of the positive electrode active materials prepared in the foregoing Examples and Comparative Examples were evaluated in the following manner.

[Mean Particle Size (D1) of Primary Particles]

A positive electrode active material solidified with epoxy resin was cut by a focused ion beam (FIB). A section was observed with a secondary ion microscope (SIM) to measure the secondary ion image of the composite oxide particles. Using any given 100 primary particles, the average value of the maximum diameter ($D_{max}$) and the minimum diameter ($D_{min}$) was obtained as the particle size ($D_n$). The mean particle size (D1) of primary particles of the composite oxide was estimated from the $D_n$ of the 100 primary particles: $D1=(D_1+D_2+\ldots+D_{100})/100$. Herein, among particle size data (particle size distribution) of the measured primary particles, only data about the largest 30% particle sizes was extracted, and 100 particles were selected from among them.

[Mean Particle Size (D2) of Secondary Particles]

The particle size distribution of a positive electrode active material was measured with a laser diffraction particle size distribution analyzer (LA-910 available from Horiba, Ltd.), and the volume basis median diameter (D50) was obtained and defined as the mean particle size of secondary particles.

[BET Specific Surface Area (S)]

According to the BET single-point method, specific surface area was measured by nitrogen gas adsorption. A Macsorb 1201 available from Mountech Co., Ltd. was used as the measuring apparatus.

[Tap Density (T)]

With the tapping stroke length set to 2.5 cm, tapping was done 100 times to obtain tap density.

[Li Occupancy (O)]

The X-ray diffraction pattern of a composite oxide was measured with an X-ray diffraction analyzer utilizing Cu-Kα radiation (RINT 2500 available from Rigaku Corporation). Using the obtained X-ray diffraction pattern, Rietveld analysis was performed. Rietveld analysis was performed by using analytical software "RIETAN 2000" (F. Izumi and T. Ikeda, Mater. Sci. Forum, 2000, freeware). Li occupancy was determined by refinement in which a part of the 3a site in the space group R3-m was replaced with another element.

(Evaluation 2)

The batteries produced in the foregoing Examples and Comparative Examples were evaluated in the following manner. Tables 19 to 21 show the results.

[Discharge Capacity]

Charge/discharge was performed at the first cycle in an ambient temperature of 20° C. in the following condition (1) to measure the discharge capacity ($C_{200}$) per gram of a positive electrode active material.

<Condition (1)>

Constant current charge: maximum current value 600 mA, end-of-charge voltage 4.2 V Constant voltage charge: voltage value 4.2 V, charging time 2 hours Constant current discharge: current value 200 mA, end-of-discharge voltage 2.5 V

[Discharge Load Characteristics]

After the first cycle charge/discharge, charge/discharge was performed at the second cycle in an ambient temperature of 20° C. in the following condition (2) to measure the discharge capacity ($C_{1000}$) at a discharge current of 1000 mA per gram of the positive electrode active material.

<Condition (2)>

Constant current charge: maximum current value 600 mA, end-of-charge voltage 4.2 V Constant voltage charge: voltage value 4.2 V, charging time 2 hours Constant current discharge: current value 1000 mA, end-of-discharge voltage 2.5 V The percentage of the discharge capacity ($C_{1000}$) at the second cycle per gram of the positive electrode active material relative to the discharge capacity ($C_{200}$) at the first cycle per gram of the positive electrode active material was obtained and defined as discharge load characteristics.

[Heat Generation Start Temperature]

After the second cycle charge/discharge, charge/discharge was performed at the third cycle in an ambient temperature of 20° C. in the above-mentioned condition (2). After the third cycle charge/discharge, charge was performed at the fourth cycle in an ambient temperature of 20° C. in the following condition (3).

<Condition (3)>

Constant current charge: maximum current value 600 mA, end-of-charge voltage 4.4 V Constant voltage charge: voltage value 4.4 V, charging time 2 hours After the completion of the charge, each battery was disassembled, and the positive electrode material mixture was taken from the positive electrode and 2 mg was placed into an SUS PAN. Using a differential scanning calorimeter (DSC), the amount of heat generation was measured as an index of thermal stability of the positive electrode material mixture. The measurement was made by using a RIGAKU Thermo Plus available from Rigaku Corporation. The temperature was raised from room temperature to 400° C. at a rate of 10° C./min in an air atmosphere to obtain a first heat generation temperature.

[Capacity Retention Rate]

After the second cycle charge/discharge, the charge/discharge cycle was repeated at an ambient temperature of 20° C. in the above-mentioned condition (2) to obtain the discharge capacity ($C_{1000-300th}$) at the 300$^{th}$ cycle. The percentage (%) of the discharge capacity ($C_{1000-300th}$) at the 300$^{th}$ cycle per gram of the positive electrode active material relative to the discharge capacity ($C_{1000}$) at the second cycle was obtained and defined as capacity retention rate.

[High-temperature Storage Characteristics]

After the second cycle charge/discharge, charge/discharge was performed at the third cycle in an ambient temperature of 20° C. in the above-mentioned condition (2). After the third cycle charge/discharge, charge was performed at the fourth cycle in an ambient temperature of 20° C. in the following condition (4).

<Condition (4)>

Constant current charge: Maximum current value 600 mA, end-of-charge voltage 4.2 V Constant voltage charge: voltage value 4.2 V, charging time 2 hours After the completion of the charge, each battery was stored in a constant temperature oven at 60° C. for 30 days. After the storage, each battery was discharged at the fourth cycle in the following condition (5).

<Condition (5)>

Constant current discharge: current value 200 mA, end-of-discharge voltage 2.5 V After the completion of the charge, charge/discharge was performed at the fifth cycle in an ambient temperature of 20° C. in the following condition (6) to obtain the discharge capacity ($C_{1000\text{-}5th}$) at the fifth cycle per gram of the positive electrode active material.

<Condition (6)>

Constant current charge: maximum current value 600 mA, end-of-charge voltage 4.2 V Constant voltage charge: voltage value 4.2 V, charging time 2 hours Constant current discharge: current value 1000 mA, end-of-discharge voltage 2.5 V The percentage of the discharge capacity ($C_{1000\text{-}5th}$) at the fifth cycle per gram of the positive electrode active material relative to the discharge capacity ($C_{1000}$) at the second cycle per gram of the positive electrode active material was obtained and defined as high-temperature storage characteristics. In this way, recovery characteristics after the high temperature storage were estimated.

TABLE 19

| | | Battery characteristics | | | | |
|---|---|---|---|---|---|---|
| | No. | Discharge capacity (mAh) | Discharge load characteristics (%) | Heat generation start temperature (° C.) | Capacity retention rate (%) | High-temperature storage characteristics (%) |
| Example | 1 | 187 | 93 | 224 | 86 | 91 |
| Example | 2 | 183 | 92 | 238 | 84 | 88 |
| Example | 3 | 184 | 92 | 226 | 83 | 87 |
| Example | 4 | 182 | 91 | 229 | 84 | 88 |
| Example | 5 | 184 | 93 | 232 | 85 | 87 |
| Example | 6 | 183 | 91 | 227 | 82 | 86 |
| Comp. Example | 7 | 193 | 88 | 191 | 67 | 72 |
| Example | 8 | 190 | 90 | 202 | 75 | 81 |
| Example | 9 | 189 | 91 | 214 | 83 | 85 |
| Example | 10 | 188 | 92 | 218 | 85 | 87 |
| Example | 11 | 182 | 93 | 228 | 86 | 92 |
| Example | 12 | 178 | 94 | 230 | 87 | 92 |
| Example | 13 | 175 | 94 | 233 | 87 | 92 |
| Comp. Example | 14 | 168 | 95 | 235 | 87 | 93 |
| Comp. Example | 15 | 192 | 94 | 188 | 85 | 84 |
| Example | 16 | 191 | 94 | 203 | 85 | 86 |
| Example | 17 | 190 | 93 | 210 | 86 | 88 |
| Example | 18 | 189 | 93 | 216 | 86 | 90 |
| Example | 19 | 181 | 93 | 234 | 87 | 91 |
| Example | 20 | 178 | 92 | 238 | 87 | 91 |
| Example | 21 | 174 | 90 | 246 | 87 | 92 |
| Comp. Example | 22 | 156 | 88 | 267 | 87 | 92 |

TABLE 20

| | | Battery characteristics | | | | |
|---|---|---|---|---|---|---|
| | No. | Discharge capacity (mAh) | Discharge load characteristics (%) | Heat generation start temperature (° C.) | Capacity retention rate (%) | High-temperature storage characteristics (%) |
| Example | 23 | 187 | 93 | 210 | 83 | 85 |
| Example | 24 | 187 | 93 | 213 | 84 | 87 |
| Example | 25 | 186 | 89 | 231 | 86 | 92 |
| Example | 26 | 185 | 87 | 235 | 86 | 90 |
| Comp. Example | 27 | 185 | 82 | 237 | 85 | 88 |
| Example | 28 | 186 | 92 | 218 | 86 | 86 |
| Example | 29 | 187 | 91 | 234 | 86 | 92 |
| Example | 30 | 187 | 88 | 236 | 83 | 90 |
| Comp. Example | 31 | 186 | 83 | 237 | 79 | 88 |

TABLE 20-continued

|  | No. | Discharge capacity (mAh) | Discharge load characteristics (%) | Heat generation start temperature (° C.) | Capacity retention rate (%) | High-temperature storage characteristics (%) |
|---|---|---|---|---|---|---|
| Comp. Example | 32 | 187 | 92 | 209 | 79 | 73 |
| Comp. Example | 33 | 184 | 92 | 205 | 77 | 71 |
| Comp. Example | 34 | 183 | 91 | 206 | 75 | 72 |
| Comp. Example | 35 | 182 | 92 | 206 | 76 | 72 |
| Comp. Example | 36 | 184 | 91 | 215 | 77 | 70 |
| Comp. Example | 37 | 182 | 92 | 207 | 75 | 71 |
| Comp. Example | 38 | 188 | 93 | 221 | 68 | 82 |
| Example | 39 | 187 | 93 | 221 | 76 | 84 |
| Example | 40 | 187 | 92 | 222 | 82 | 87 |
| Example | 41 | 187 | 92 | 222 | 85 | 89 |
| Example | 42 | 186 | 91 | 224 | 86 | 91 |
| Example | 43 | 184 | 91 | 227 | 86 | 92 |
| Example | 44 | 182 | 90 | 230 | 87 | 92 |
| Comp. Example | 45 | 178 | 87 | 238 | 88 | 93 |

TABLE 21

|  | No. | Discharge capacity (mAh) | Discharge load characteristics (%) | Heat generation start temperature (° C.) | Capacity retention rate (%) | High-temperature storage characteristics (%) |
|---|---|---|---|---|---|---|
| Comp. Example | 46 | 188 | 94 | 223 | 66 | 80 |
| Example | 47 | 187 | 94 | 223 | 75 | 83 |
| Example | 48 | 187 | 93 | 223 | 80 | 87 |
| Example | 49 | 187 | 93 | 224 | 82 | 89 |
| Example | 50 | 186 | 93 | 224 | 86 | 91 |
| Example | 51 | 184 | 93 | 226 | 86 | 91 |
| Example | 52 | 179 | 90 | 229 | 87 | 92 |
| Comp. Example | 53 | 169 | 84 | 235 | 87 | 92 |
| Comp. Example | 54 | 189 | 92 | 221 | 74 | 81 |
| Example | 55 | 188 | 93 | 222 | 80 | 88 |
| Example | 56 | 187 | 93 | 224 | 84 | 90 |
| Example | 57 | 187 | 93 | 224 | 86 | 91 |
| Example | 58 | 187 | 92 | 225 | 83 | 90 |
| Example | 59 | 186 | 92 | 228 | 79 | 87 |
| Comp. Example | 60 | 181 | 93 | 234 | 73 | 79 |
| Comp. Example | 61 | 191 | 94 | 217 | 65 | 76 |
| Comp. Example | 62 | 190 | 94 | 218 | 66 | 78 |
| Comp. Example | 63 | 189 | 93 | 217 | 66 | 78 |
| Comp. Example | 64 | 188 | 93 | 221 | 72 | 79 |
| Comp. Example | 65 | 188 | 93 | 222 | 71 | 79 |
| Example | 66 | 187 | 93 | 225 | 85 | 91 |
| Example | 67 | 186 | 92 | 226 | 84 | 90 |
| Comp. Example | 68 | 156 | 79 | 218 | 86 | 90 |

TABLE 21-continued

| | No. | Discharge capacity (mAh) | Discharge load characteristics (%) | Heat generation start temperature (° C.) | Capacity retention rate (%) | High-temperature storage characteristics (%) |
|---|---|---|---|---|---|---|
| | | | | Battery characteristics | | |
| Example | 69 | 182 | 87 | 221 | 86 | 91 |
| Example | 70 | 187 | 93 | 224 | 87 | 90 |
| Example | 71 | 188 | 93 | 225 | 86 | 82 |
| Comp. Example | 72 | 188 | 93 | 227 | 84 | 78 |

(Observations)
[Observations on $M^1$]

In comparison with the batteries 61 and 63 including no element $M^1$, it can be seen that the batteries 1 to 6 of Example including Mn, Ti, Y, Nb, Mo, or W as the element $M^1$ exhibit high capacity retention rates and high high-temperature storage characteristics.

[Observations on the Value y]

Figure 2:
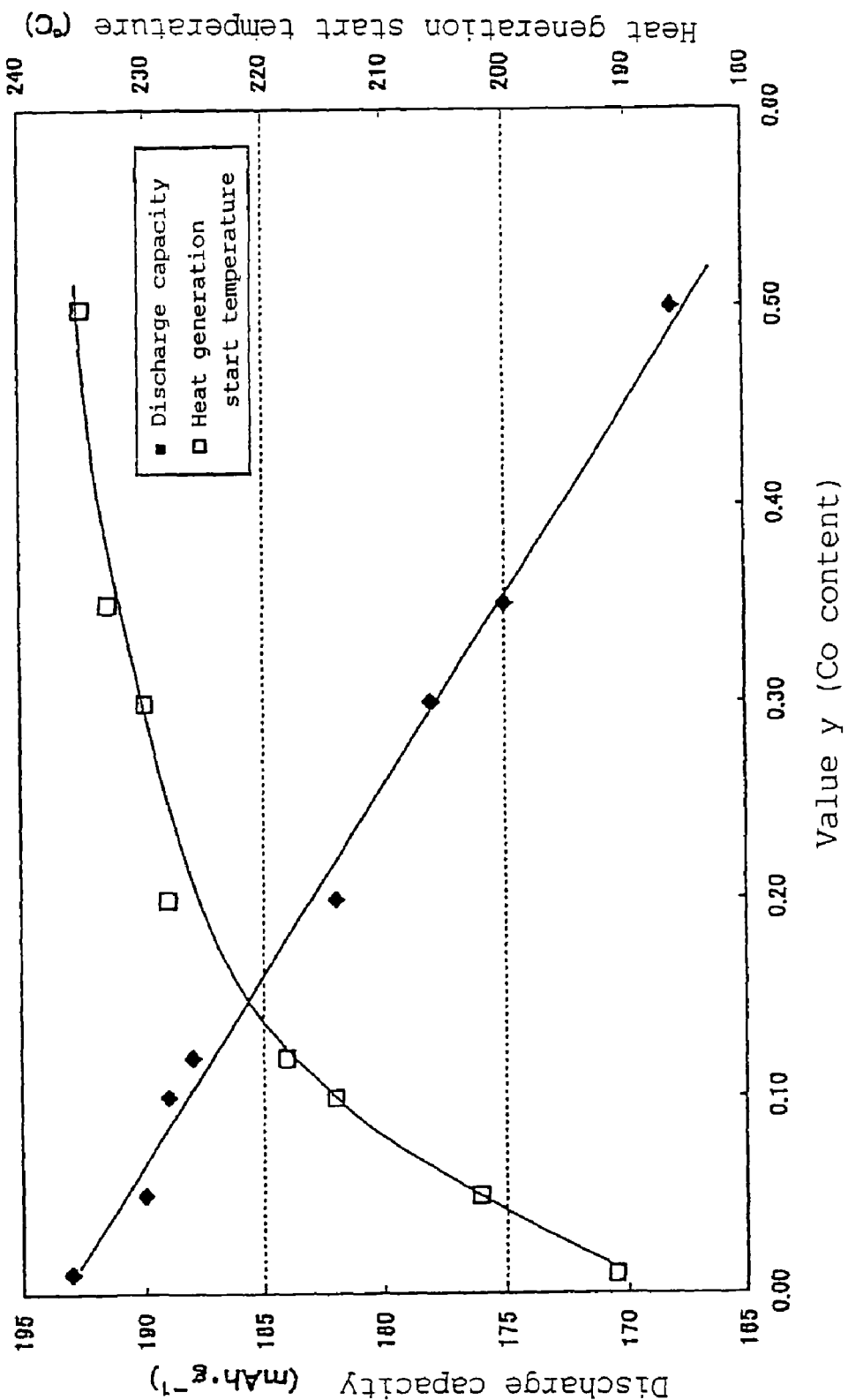
FIG. 2 is a graph showing the relation between the value y representing the Co content in lithium-containing composite oxides, discharge capacity, and heat generation start temperature.

FIG. 2 shows the relation between the value y representing the Co content, discharge capacity, and heat generation start temperature. In order to maintain the inherent high capacity of lithium nickel oxides, the discharge capacity is desirably 170 mAh/g or more, and the heat generation start temperature needs to be 200° C. or more. From such viewpoints, the value y needs to satisfy $0.05 \leq y \leq 0.35$, preferably $0.10 \leq y \leq 0.30$, and more preferably $0.12 \leq y \leq 0.20$.

[Observations on the Value z]

Figure 3:
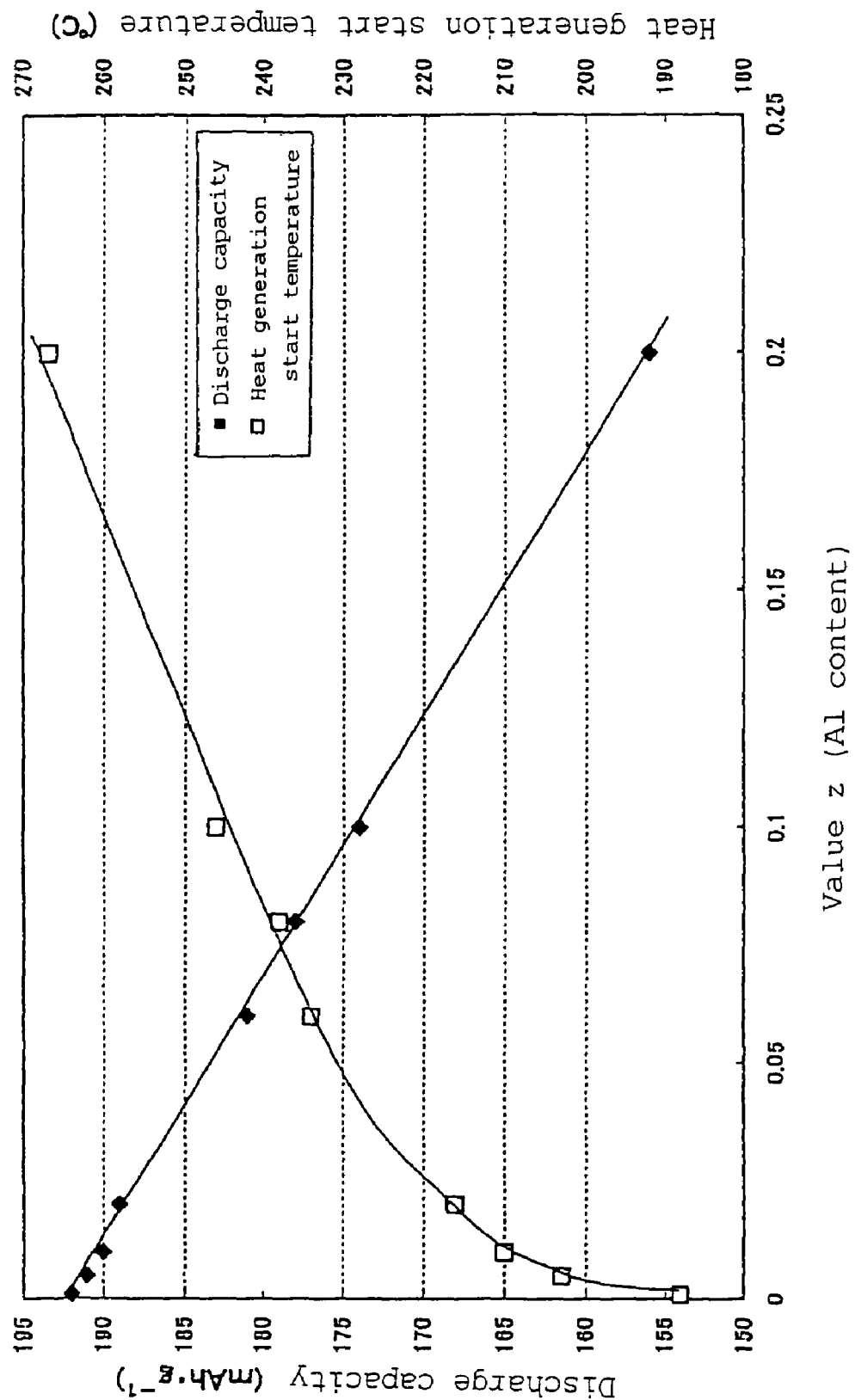
FIG. 3 is a graph showing the relation between the value z representing the Al content in lithium-containing composite oxides, discharge capacity, and heat generation start temperature.

FIG. 3 shows the relation between the value z representing the Al content, discharge capacity, and heat generation start temperature. FIG. 3 indicates that the value z needs to satisfy $0.005 \leq z \leq 0.1$, preferably $0.01 \leq z \leq 0.08$, and more preferably $0.02 \leq z \leq 0.06$.

[Observations on the Value x and Li Occupancy]

Figure 4:
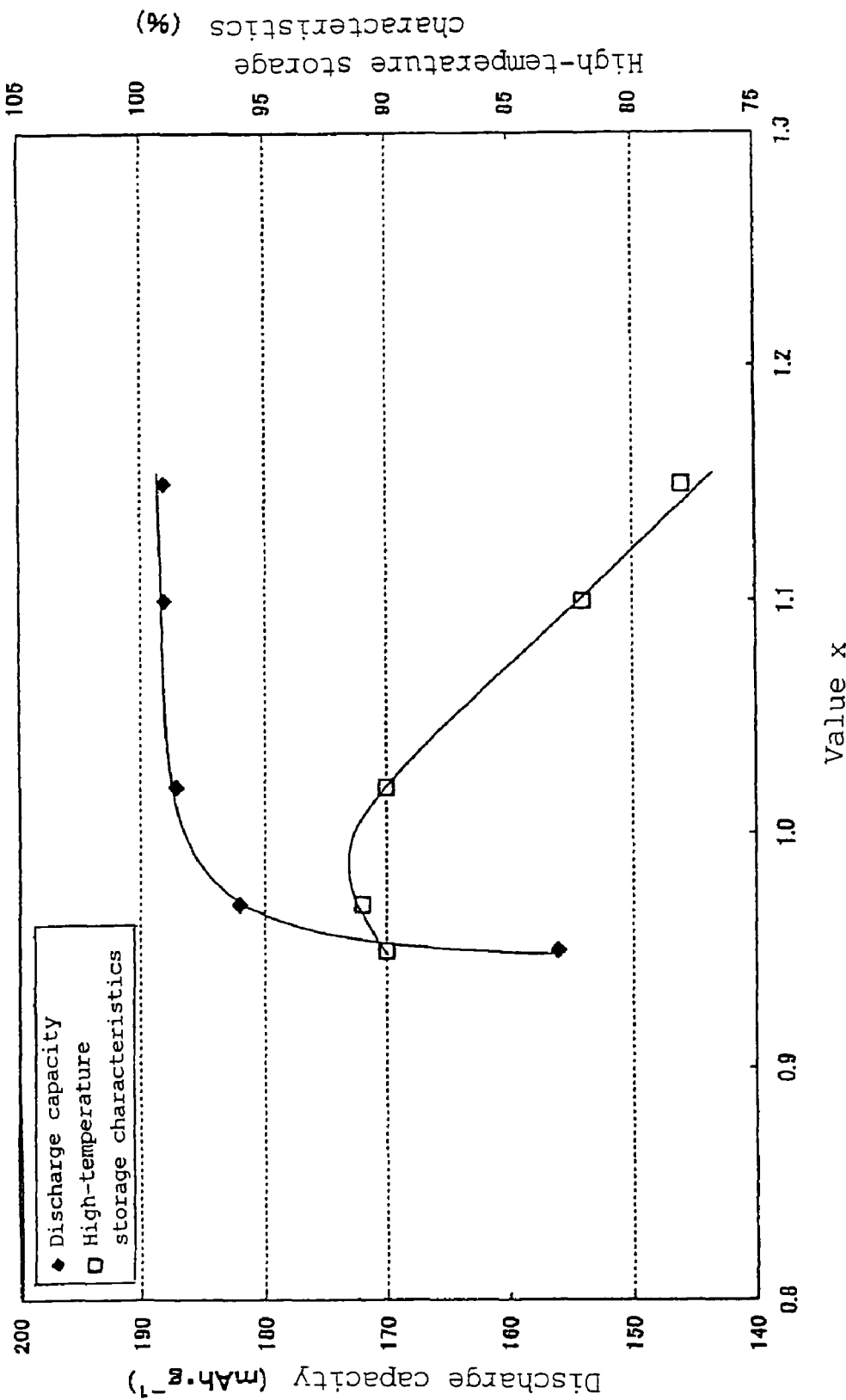
FIG. 4 is a graph showing the relation between the value x representing the Li content in lithium-containing composite oxides, discharge capacity, and high-temperature storage characteristics.

FIG. 4 shows the relation between the value x representing the Li content, discharge capacity, and high-temperature storage characteristics, based on the batteries 68 to 72. It indicates that in term of capacity, the value x needs to be 0.97 or more. Similarly, the result shows that the Li occupancy is preferably 97% or more. On the other hand, it shows that the high-temperature storage characteristics need to be 80% or more and that the value x needs to be 1.1 or less. If the value x exceeds 1.1, it is believed that side reaction during high temperature storage increases as the amount of surplus Li increases.

[Observations on $M^2$]

In comparison with the batteries 61 and 62 including no element $M^2$, it can be seen that the batteries 1 to 6 of Example including Mg and Ca as the element $M^2$, the battery 66 of Example including Mg, Ca, and Sr as the element $M^2$, and the battery 67 of Example including Mg, Ca, and Ba as the element $M^2$ exhibit high capacity retention rates and high high-temperature storage characteristics.

[Observations on D1 and D2]

In the batteries 32 to 37 of Comparative Example 1 whose positive electrode active materials were prepared by adding Al ions to a raw material aqueous solution and co-precipitating an Al-containing hydroxide, D1 is less than 0.1 μm and D2 is also less than 8 μm. On the other hand, in the case of the batteries 1 to 31 of Example 1 whose positive electrode active materials were prepared by co-precipitating an Al-free hydroxide and later adding Al, D1 is 0.1 μm or more and D2 is also 8 μm or more. From this, it can be understood that in order to obtain a positive electrode active material of the composition of the formula 1 having a mean particle size D1 of primary particles of 0.1 μm or more and a mean particle size D2 of secondary particles of 8 μm or more, it is of great importance to co-precipitate an Al-free hydroxide and later add Al to synthesize a lithium-containing composite oxide.

INDUSTRIAL APPLICABILITY

The present invention provides a high-capacity non-aqueous electrolyte secondary battery that is excellent in both cycle characteristics and high-temperature storage characteristics, as well as discharge load characteristics. The non-aqueous electrolyte secondary battery of the present invention can be used as a power source in a wide range of applications from high-performance required portable electronic devices to electric vehicles and hybrid vehicles.

The invention claimed is:

1. A positive electrode active material for a non-aqueous electrolyte secondary battery, said positive electrode active material comprising a lithium-containing composite oxide represented by the formula 1: $Li_xNi_{1-y-z-v-w}Co_yAl_zM^1_vM^2_wO_2$, wherein the element $M^1$ in said formula 1 is at least one selected from the group consisting of Mn, Ti, Y, Nb, Mo, and W, the element $M^2$ in said formula 1 includes at least two selected from the group consisting of Mg, Ca, Sr, and Ba, the element $M^2$ including at least Mg with an atom number of w1 and Ca with an atom number of w2, the ratio of the total of Mg and Ca to the element $M^2$ being 50 atomic percent or more, said formula 1 satisfies $0.97 \leq x \leq 1.1$, $0.05 \leq y \leq 0.35$, $0.005 \leq z \leq 0.1$, $0.0001 \leq v \leq 0.05$, $0.0001 \leq w \leq 0.05$, $0.1 \leq v/w \leq 10$ and $2 \leq w1/w2 \leq 20$, said composite oxide comprises primary particles, said primary particles forming secondary particles, said primary particles have a mean particle size of 0.1 μm or more and 3 μm or less, and said secondary particles have a mean particle size of 8 μm or more and 20 μm or less.

2. The positive electrode active material in accordance with claim 1, wherein the BET specific surface area of said composite oxide as measured by nitrogen gas adsorption is 0.2 m²/g or more and 1.5 m²/g or less.

3. The positive electrode active material in accordance with claim 1, wherein said composite oxide has a tap density of 2.2 g/cm³ or more and 2.8 g/cm³ or less.

4. The positive electrode active material in accordance with claim 1, wherein said composite oxide is crystalline such that the Li occupancy in a Li site as determined by Rietveld analysis is 97% or more.

5. A non-aqueous electrolyte secondary battery comprising a positive electrode, a negative electrode, a separator interposed between said positive electrode and said negative electrode, and an electrolyte, wherein said positive electrode includes a positive electrode active material comprising a lithium-containing composite oxide, said composite oxide is represented by the formula 1:
$Li_xNi_{1-y-z-v-w}Co_yAl_zM^1_vM^2_wO_2$,
the element $M^1$ in said formula 1 is at least one selected from the group consisting of Mn, Ti, Y, Nb, Mo, and W,
the element $M^2$ in said formula 1 includes at least two selected from the group consisting of Mg, Ca, Sr, and Ba, the element $M^2$ including at least Mg with an atom number of w1 and Ca with an atom number of w2, the ratio of the total of Mg and Ca to the element $M^2$ being 50 atomic percent or more,
said formula 1 satisfies $0.97 \leq x \leq 1.1$, $0.05 \leq y \leq 0.35$, $0.005 \leq z \leq 0.1$, $0.0001 \leq v \leq 0.005$, $0.0001 \leq w \leq 0.05$, $0.1 \leq v/w \leq 10$ and $2 \leq w1/w2 \leq 20$,
said composite oxide comprises primary particles, said primary particles forming secondary particles,
said primary particles have a mean particle size of 0.1 μm or more and 3 μm or less, and
said secondary particles have a mean particle size of 8 μm or more and 20 μm or less.

6. The non-aqueous electrolyte secondary battery in accordance with claim 5, wherein the BET specific surface area of said composite oxide as measured by nitrogen gas adsorption is 0.2 m²/g or more and 1.5 m²/g or less.

7. The non-aqueous electrolyte secondary battery in accordance with claim 5, wherein said composite oxide has a tap density of 2.2 g/cm³ or more and 2.8 g/cm³ or less.

8. The non-aqueous electrolyte secondary battery in accordance with claim 5, wherein said composite oxide is crystalline such that the Li occupancy in a Li site as determined by Rietveld analysis is 97% or more.

9. A method for producing a positive electrode active material that comprises a lithium-containing composite oxide represented by the formula 1: $Li_xNi_{1-y-z-v-w}Co_yAl_zM^1_vM^2_wO_2$, said method comprising the steps of:
(a) preparing a hydroxide represented by the formula 2: $Ni_{1-y-v-w}Co_yM^1_vM^2_w(OH)_2$;
(b) adding an Al-containing compound to said hydroxide to obtain a first composition;
(c) baking said first composition in an oxidizing atmosphere to obtain a first oxide;
(d) adding a Li-containing compound to said first oxide to obtain a second composition; and
(e) baking said second composition in an oxidizing atmosphere to obtain the lithium-containing composite oxide represented by the formula 1 as a second oxide,
wherein the element $M_1$ in said formulae 1 and 2 is at least one selected from the group consisting of Mn, Ti, Y, Nb, Mo, and W,
the element $M^2$ in said formulae 1 and 2 includes at least two selected from the group consisting of Mg, Ca, Sr, and Ba, the element $M^2$ including at least Mg and Ca,
said formulae 1 and 2 satisfy $0.05 \leq y \leq 0.35$, $0.0001 \leq v \leq 0.05$, and $0.0001 \leq w \leq 0.05$, and
said formula 1 satisfies $0.97 \leq x \leq 1.1$ and $0.005 \leq z \leq 0.1$.

10. The method for producing a positive electrode active material for a non-aqueous electrolyte secondary battery in accordance with claim 9, wherein said step (b) comprises a step of adding $NaAlO_2$ to said hydroxide that is stirred in water and then adjusting the pH of the water to 10 to 8 by using an acid.

11. The method for producing a positive electrode active material in accordance with claim 9, wherein in said step (c), said first composition is baked at 500° C. or more and 1100° C. or less in an oxidizing atmosphere.

12. The method for producing a positive electrode active material in accordance with claim 9, wherein in said step (e), said second composition is baked at 600° C. or more and 850° C. or less in an oxidizing atmosphere.

* * * * *